(12) United States Patent
Mollard et al.

(10) Patent No.: US 12,607,846 B2
(45) Date of Patent: Apr. 21, 2026

(54) REFLECTOR DEVICE FOR EMITTING A PLURALITY OF REFLECTED BEAMS FROM A SINGLE MAIN LIGHT BEAM

(71) Applicant: COMMISSARIAT A L'ENERGIE ATOMIQUE ET AUX ENERGIES ALTERNATIVES, Paris (FR)

(72) Inventors: Laurent Mollard, Grenoble (FR); Laurent Frey, Grenoble (FR); François Gardien, Grenoble (FR); Jean Hue, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 285 days.

(21) Appl. No.: 18/554,916

(22) PCT Filed: Apr. 8, 2022

(86) PCT No.: PCT/FR2022/050662
§ 371 (c)(1),
(2) Date: Oct. 11, 2023

(87) PCT Pub. No.: WO2022/219272
PCT Pub. Date: Oct. 20, 2022

(65) Prior Publication Data
US 2024/0192482 A1 Jun. 13, 2024

(30) Foreign Application Priority Data
Apr. 12, 2021 (FR) ........................................ 2103720

(51) Int. Cl.
*G02B 26/08* (2006.01)
*G02B 27/14* (2006.01)

(52) U.S. Cl.
CPC ....... *G02B 26/0833* (2013.01); *G02B 27/144* (2013.01); *G02B 27/146* (2013.01)

(58) Field of Classification Search
CPC ............. G02B 26/0833; G02B 27/144; G02B 27/146; G02B 27/145
See application file for complete search history.

(56) References Cited

U.S. PATENT DOCUMENTS

2003/0019854 A1* 1/2003 Gross ................... G02B 27/145
219/121.73
2003/0024912 A1 2/2003 Gross et al.
(Continued)

FOREIGN PATENT DOCUMENTS

EP 3 726 268 A1 10/2020
WO WO 02/101888 A2 12/2002

OTHER PUBLICATIONS

International Search Report Issued Jul. 13, 2022, in PCT/FR2022/050662, filed on Apr. 8, 2022, with English Translation, therein, 15 pages.

*Primary Examiner* — Mariam Qureshi
(74) *Attorney, Agent, or Firm* — Oblon, McClelland, Maier & Neustadt, L.L.P.

(57) ABSTRACT

A reflector device that includes a support, a light source arranged to emit a principal light beam, N mirrors, partially transparent, assembled on the support, and delimited by a partially reflective front face, and a rear face, the mirrors are arranged from a first position to an Nth position, so that the principal light beam is incident on the front face of the mirror in the first position, and interacts successively, in the order, with each mirror to form a beam reflected by the front face and a beam transmitted by the rear face, the beam
(Continued)

reflected by the front face of a mirror in a position i resulting from the reflection of the beam transmitted by the rear face of the mirror in position i–1.

16 Claims, 10 Drawing Sheets

(56)  References Cited

U.S. PATENT DOCUMENTS

| | | | |
|---|---|---|---|
| 2003/0042230 A1 | 3/2003 | Gross et al. | |
| 2003/0047546 A1 | 3/2003 | Gross et al. | |
| 2003/0048814 A1 | 3/2003 | Gross et al. | |
| 2004/0056009 A1 | 3/2004 | Gross et al. | |
| 2006/0146395 A1 | 7/2006 | Gross et al. | |
| 2012/0327248 A1* | 12/2012 | Tack ......................... | G01J 3/12 |
| | | | 348/262 |
| 2013/0278907 A1* | 10/2013 | Abele ................ | G02B 26/0875 |
| | | | 29/25.35 |
| 2018/0348562 A1 | 12/2018 | Yoshida | |
| 2020/0150332 A1* | 5/2020 | Nakamura ........... | G02B 27/145 |
| 2020/0333547 A1 | 10/2020 | Mollard et al. | |
| 2021/0341729 A1* | 11/2021 | Alpern ............... | G02B 26/0858 |

* cited by examiner

REFLECTOR DEVICE FOR EMITTING A PLURALITY OF REFLECTED BEAMS FROM A SINGLE MAIN LIGHT BEAM

TECHNICAL FIELD

The present invention relates to the field of optical and/or optronic systems. More particularly, the invention relates to the field of imaging, for example of scenes, or to the detection field.

More particularly, the invention relates to a reflector device provided with a plurality of mirrors arranged so as to form a plurality of reflected beams from one and the same incident light beam. The mirrors are advantageously movable on one or more pivot axes so that each beam reflected by a given mirror sweeps a surface as soon as a movement is imposed on said mirror.

PRIOR ART

Micro-mirrors are now widely present in the MEMS field and in particular in devices of the LIDAR type ("Light Detection and Ranging systems").

These make it possible in particular to sweep a surface or a target with light radiation for detection or imaging purposes.

In this regard, in these devices of the LIDAR type, the micro-mirrors are arranged to oscillate on one or two pivot axes, at a predetermined sweep frequency, so as to reflect an incident radiation in various directions.

The sweep frequency of the micro-mirrors can vary from a few Hz to several kHz, and their size can be of the order of a few tens of micrometres to several millimetres (for example a few millimetres in diameter for micro-mirrors in disc form), and can in particular be between 500 $\mu$m and 10 mm.

FIG. 1 (extracted from document [1] cited at the end of the description) illustrates a first possible architecture of a device provided with two micro-mirrors, referred to respectively as first micro-mirror $1_1$ and second micro-mirror $2_1$, arranged to pivot about, respectively, a first pivot axis $X_1X_1'$ and a second pivot axis $Y_1Y_1'$ that are non-parallel. In particular, these two micro-mirrors $1_1$ and $2_1$ are arranged so that a light beam emitted by a light source $31$ is reflected by the first micromirror $1_1$ in the direction of the second micromirror $2_1$, which reflects it in its turn in the direction, for example, of a screen $41$. The rotation of each of the micro-mirrors $1_1$ and $2_1$ about their respective pivot axes thus makes it possible to sweep a surface with the light beam, for example for imaging or detection purposes.

Such an architecture is however not satisfactory.

This is because this architecture requires precise alignment of the two micro-mirrors and is consequently difficult to implement.

Moreover, the area able to be swept by the light beam remains relatively limited.

A second architecture, illustrated in FIG. 2 (extracted from document [1] cited at the end of the description), can be envisaged. This uses a single micromirror $1_2$ mounted so as to pivot about two pivot axes $X_2X_2'$ and $Y_2Y_2'$ that are non-parallel. The oscillation of this micromirror $1_2$ about each of the two pivot axes $X_2X_2'$ and $Y_2Y_2'$ thus makes it possible to sweep the surface of a screen $4_2$ by means of a light beam coming from a light source $3_2$ and reflected by said micromirror $1_2$.

However, this second architecture is also not satisfactory.

This is because the latter, although simpler to integrate, does not make it possible to sweep large surfaces with the light beam.

One of the aims of the present invention is therefore to propose a reflector device that offers greater flexibility in terms of sweep area.

In particular, one aim of the present invention is to propose a reflector device able to sweep a surface with a greater extent than the known devices of the prior art.

Another aim of the present invention is to propose a device, certain electro-optical or optical performances of which, such as angular resolution, are improved compared with the known devices of the prior art.

DESCRIPTION OF THE INVENTION

The aims of the present invention are, at least partly, achieved by a reflector device intended to form N reflected beams from a principal light beam, the device comprises:
a support;
a light source arranged to emit a principal light beam on a principal axis;
N mirrors, N being an integer greater than or equal to 2, partially transparent, assembled on the support, and delimited by a partially reflective front face, and a rear face opposite to the front face,
the mirrors are arranged, in an order, from a first position to an $N^{th}$ position, so that the principal light beam is incident on the front face of the mirror in the first position, and interacts successively, in the order, with each mirror to form a beam reflected by the front face and a beam transmitted by the rear face, the beam reflected by the front face of the mirror in a position i, i between 2 and N, resulting from the reflection of the beam transmitted by the rear face of the mirror in position i–1.

According to one embodiment, each mirror is mounted so as to pivot about one or more pivot axes, and is associated with one or more actuators arranged to pivot said mirror on one or other or both of the pivot axes, advantageously an actuator comprises at least one of the elements selected from: an electrostatic actuator, a magnetic actuator, a piezoelectric actuator, a thermal actuator. For example, mirrors having two pivot axes can be provided.

According to one embodiment, the N mirrors are arranged on successive parallel planes so that the centres of the N mirrors are essentially aligned on the principal axis.

According to one embodiment, the N mirrors each have a circular shape, and a radius increasing from the first position to the $N^{th}$ position in the principal order.

According to one embodiment, N is equal to 2, and the reflector device also comprises a secondary mirror arranged so that a secondary beam incident on the front face of the mirror in first position is firstly partially reflected by said front face and secondly partially transmitted by the rear face of said mirror and then reflected by a secondary front face of the secondary mirror.

According to one embodiment, said reflector device comprises a secondary light source able to emit the secondary light beam.

According to one embodiment, the secondary mirror is arranged so that the respective centres of the secondary mirror and of the mirror in first position define an axis, referred to as secondary axis, different from the principal axis, and wherein the secondary light source is arranged so that the secondary light beam is emitted on the secondary axis.

According to one embodiment, optical elements are used to convey the light beam transmitted by the rear face of a mirror in a given position to the front face of the mirror in the following position in the principal order.

According to one embodiment, an optical element comprises at least one of the components selected from: a prism, a deflector mirror, a lens.

According to one embodiment, each mirror comprises, from its front face to its rear face, a partially reflective layer and a mechanical support layer.

According to one embodiment, the partially reflective layer comprises a Bragg stack, the Bragg stack comprising at least one elementary Bragg stack.

According to one embodiment, an elementary Bragg stack comprises a stack of two dielectric and/or semiconductor layers. Advantageously, the elementary Bragg stack comprises a layer of amorphous silicon and a layer of silicon oxide.

According to one embodiment, the Bragg stack is limited to one or two elementary Bragg stacks.

According to one embodiment, the mechanical support layer comprises a semiconductor material, advantageously silicon, even more advantageously monocrystalline silicon.

According to one embodiment, the N mirrors are arranged so that each of the N light beams sweeps a different surface.

According to one embodiment, at least one mirror is arranged so that the surface swept by the light beam reflected by the front face of the mirror in question has a reduced extent compared with the surfaces swept by the other reflected light beams.

According to one embodiment, at least one mirror among the N mirrors forms an optical filter or spectral filter (wavelength filter).

Advantageously, the light beam has a wavelength of between 1400 nm and 1700 nm, preferably 1550 nm.

According to one embodiment, among said N mirrors, the one arranged in first position is configured to transmit, to a mirror arranged in second position, the principal light beam incident at more than 50%.

BRIEF DESCRIPTION OF THE DRAWINGS

Other features and advantages will emerge in the following description of a reflector device according to the invention, given by way of non-limitative examples, with reference to the accompanying drawings, wherein:

FIG. 5 illustrates the formation of the beams reflected and transmitted at respectively the front faces and the rear faces of each of the mirrors;

DETAILED DESCRIPTION OF PARTICULAR EMBODIMENTS

The present invention relates to a reflector device intended to form a plurality of independent light beams from a single or from one and the same light source. The reflector device, according to the present invention, comprises, in this regard, a plurality of mirrors configured to partially reflect and transmit an incident beam on their front face. The mirrors are thus arranged, in an order, from a first position to an $N^{th}$ position, so that a principal light beam incident on the front face of the mirror in first position interacts successively, and in the order, with each mirror to form a beam reflected by the front face and a beam transmitted by the rear face of the mirror in question. More particularly, the beam reflected by the front face of the mirror in a position i, i between 2 and N, results from the reflection of the beam transmitted by the rear face of the mirror in position i−1.

Figure 1:
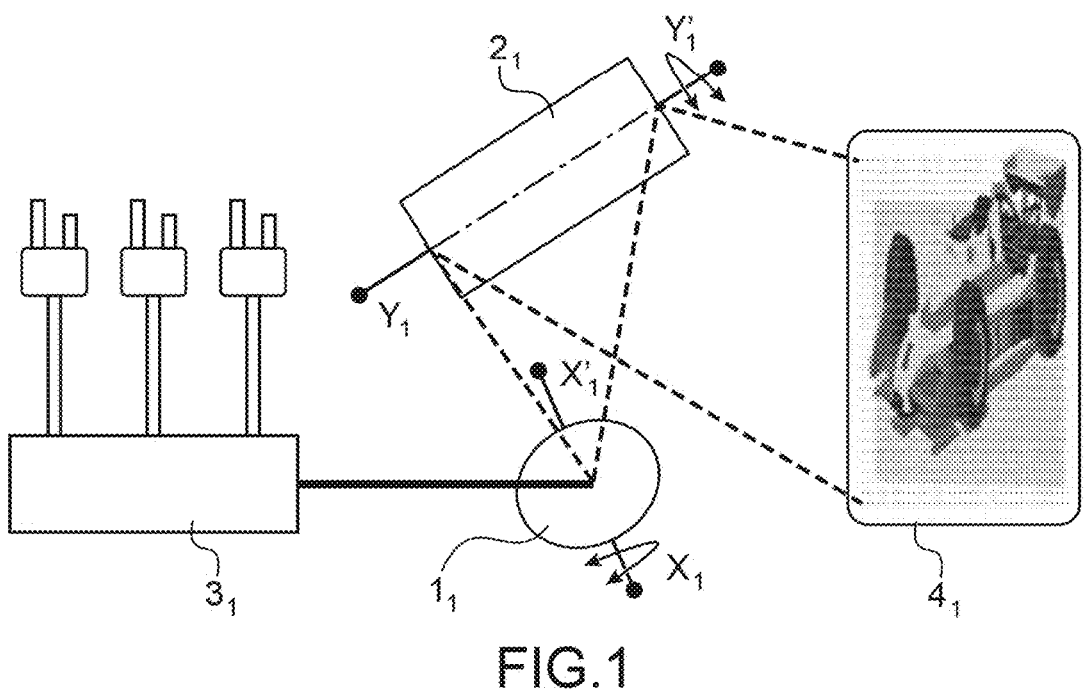
FIG. 1 illustrates a first architecture of a light sweeping device known from the prior art, in particular from document [1] cited at the end of the description, the device comprises in particular two micro-mirrors mounted each so as to pivot about a pivot axis, the pivot axes being different from each other and non-parallel.
Figure 2:
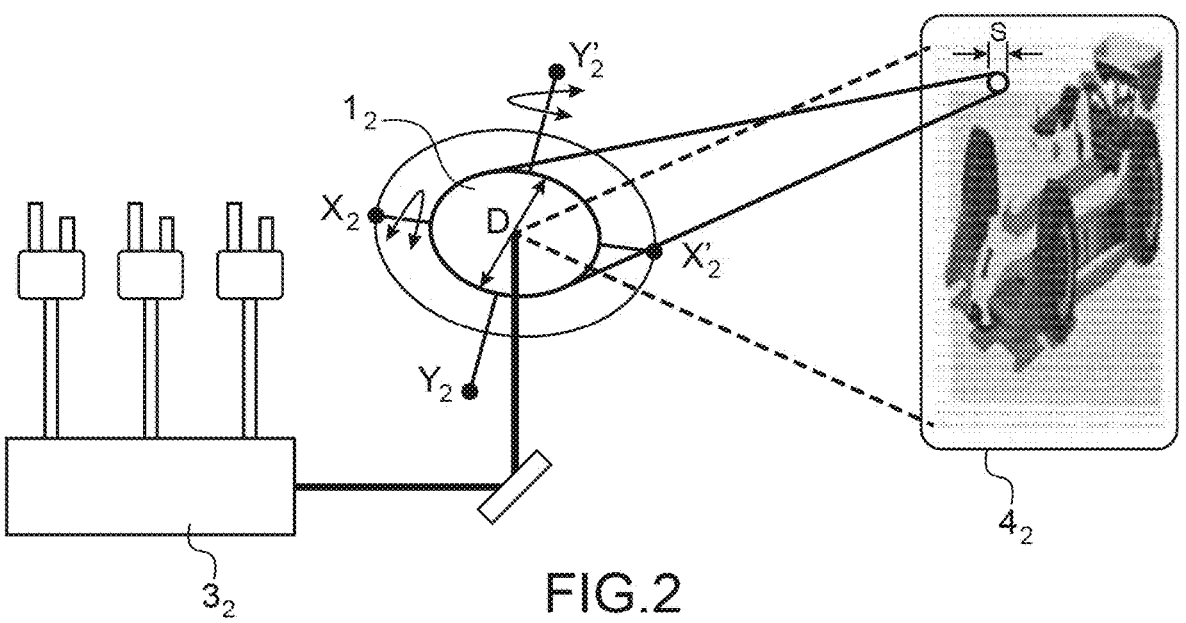
FIG. 2 illustrates a second architecture of a light sweeping device known from the prior art, in particular from document [1] cited at the end of the description, the device comprises in particular a micro-mirror mounted so as to pivot about two different and non-parallel pivot axes.
Figure 3:
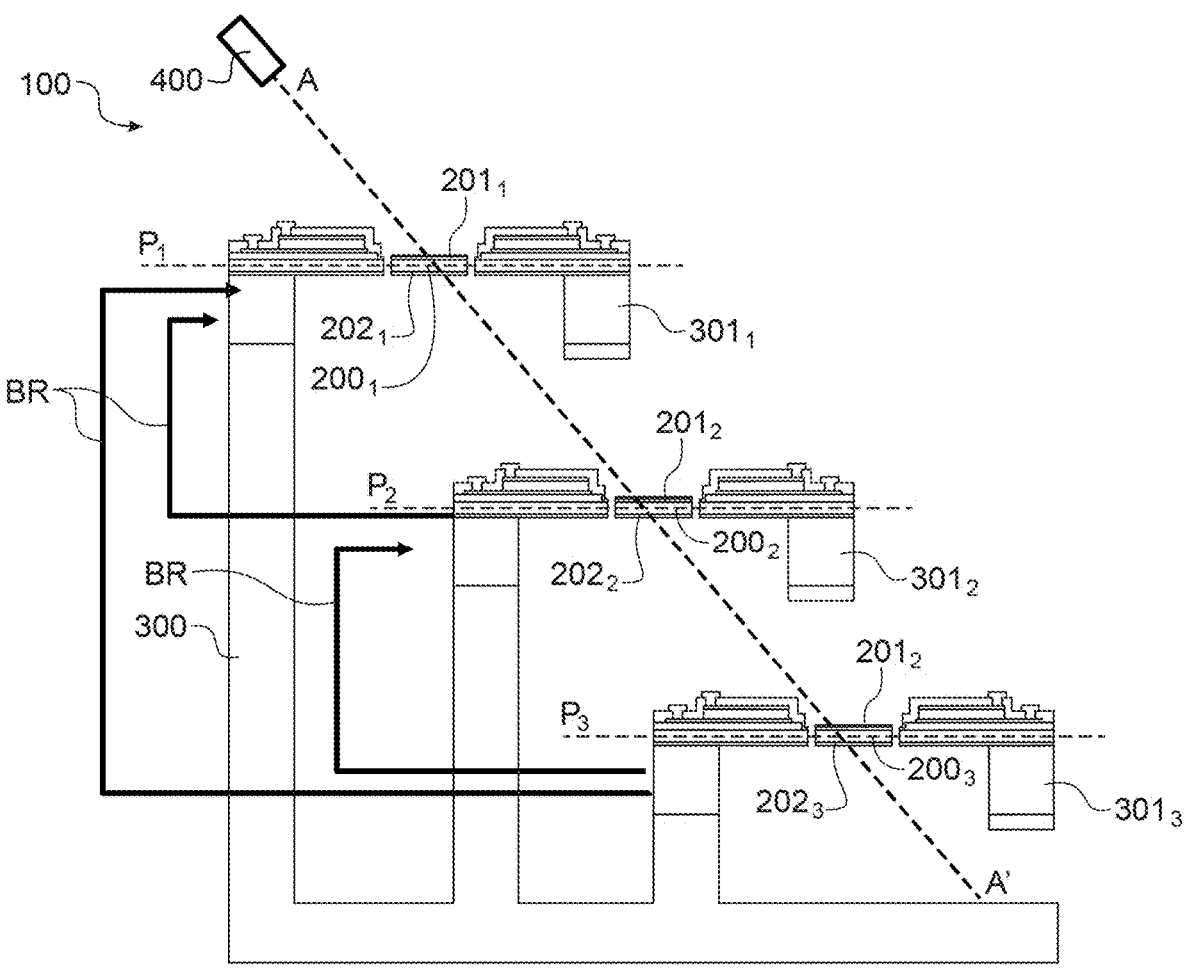
FIG. 3 is a schematic representation in a cross-sectional plane perpendicular to each of the mirrors of a reflector device according to a first embodiment of the present invention.

FIG. 3 is a schematic representation of a reflector device 100 according to a first embodiment of the present invention.

This reflector device 100 comprises in particular N (N integer greater than or equal to 2) mirrors (with for example N=3 mirrors $200_1$, $200_2$, $200_3$ shown on FIG. 3) assembled on a support 300. Assembling each of the mirrors $200_1$ to $200_3$ may involve an intermediate support $300_1$ to $300_3$ resting on the support 300.

The reflector device 100 also comprises a light source 400 arranged to emit a principal light beam on a principal axis AA'. The principal light beam may be a polychromatic radiation, and in particular may cover a continuous range of wavelengths, for example in the infrared domain (between 900 nm and 2100 nm). Alternatively, the principal light beam may be quasi-monochromatic or even monochromatic, in particular a laser, with a wavelength preferably between 1400 nm and 1700 nm, preferentially 1550 nm.

Each mirror $200_i$ (with i between 1 and N) is in particular configured to partially reflect, through a front face $201_i$, the light beam, able to be emitted by the light source $400$, incident on said front face $201_i$, and to partially transmit said light beam through a rear face $202_i$ opposite to the front face $201_i$. In other words, each mirror $200_i$ is partially reflective through its front face $201_i$, and partially transparent with regard to the light beam able to be emitted by the light source $400$.

According to the present invention, the mirrors $200_1$ to $200_N$ are arranged, in an order, from a first position to an $N^{th}$ position, so that the principal light beam, incident on the principal front face $201_1$ of the mirror $200_1$ in first position, successively passes through, in the order, all the mirrors $200_1$ to $200_N$.

More particular, according to this first embodiment, the N mirrors $200_1$ to $200_N$ are arranged on successive parallel planes $P_1$ to $P_N$ (only the planes $P_1$, $P_2$ and $P_3$ are shown on FIG. 3) and so that the centres of the N mirrors are essentially aligned on the principal axis.

Figures 4A, 4B, 5:
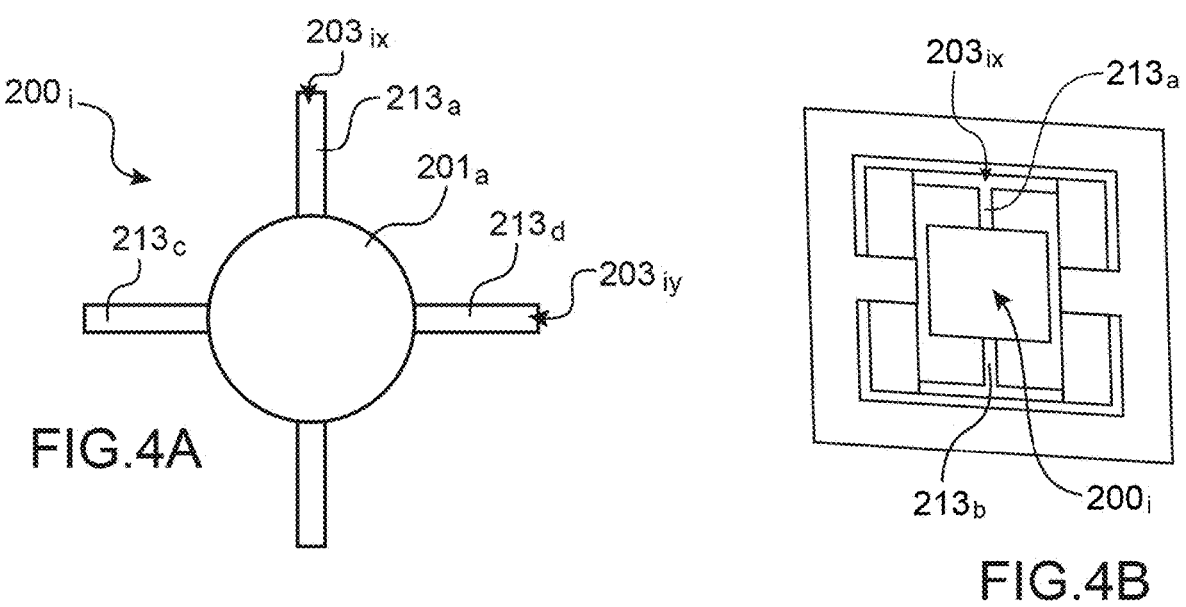
FIGS. 4A, 4B are schematic representations of a mirror through its front face, and provided with one or more pivot axes.
FIG. 5 illustrates the interaction of the principal light beam with each of the mirrors of the device shown in FIG. 3, in particular

Thus the principal light beam $f_p$ interacts successively, in the order, with the mirrors $200_1$ to $200_N$. The principal beam interacts firstly with the first mirror $200_1$, and produces a reflected beam $f_{r1}$ and a transmitted beam $f_{t1}$. This phenomenon is reproduced at the second mirror $200_2$. More generally, as illustrated in FIG. 5, the interaction of the principal light beam $f_p$ with a given mirror $200_1$ results in particular in the formation of a beam $f_{ri}$ reflected by its front face $201_i$ and a beam $f_{ti}$ transmitted by its rear face $202_i$. More particularly, the beam $f_{ri}$ reflected by the front face $201_i$ of a mirror in a position i, i between 2 and N, results from the reflection, on said front face $201_i$, of the beam $f_{ti}$ transmitted by the rear face $202_{i-1}$ of the mirror in position i−1.

Thus the reflector device $100$ according to the present invention makes it possible to form N independent reflected beams with a single or one and the same principal light beam $f_p$.

Still in relation to FIG. 5, the mirror $200_1$, in first position, can be adapted to fully reflect $(f_{r1})$ a first range of wavelengths of the principal range, and to transmit $(f_{t1})$ the other wavelengths. The mirror $200_2$ (in second position), for its part, can be adapted to reflect $(f_{r2})$ a second range of wavelengths different from the first range.

According to a particular embodiment, the first mirror $200_1$, disposed in first position, can be adapted to transmit an incident light beam, in particular an incident laser beam, at more than 50%.

In this case, preferably the more superimposed micromirrors the device includes, the greater the transmission by the first mirror is designed to be. The percentage of transmission between each mirror is then adapted according to the number of mirrors and the applications sought.

Particularly advantageously, each mirror $200_1$ to $200_N$ is mounted so as to pivot about one or more pivot axes, for example two pivot axes, and is associated with one or more actuators $500_1$ to $500_N$ arranged to pivot said mirror on one and/or other of the pivot axis. Still advantageously, an actuator $500_1$ to $500_N$ can comprise at least one of the elements selected from: an electrostatic actuator, a magnetic actuator, a piezoelectric actuator, a thermal actuator.

The actuators may, moreover, be controlled by control means, for example provided with at least one microprocessor.

The rotation of a mirror $200_i$ about its pivot axes $203_{ix}$, $203_{iy}$, advantageously perpendicular, thus makes it possible to sweep a surface with the beam $f_{ri}$ reflected by the front face $201_i$, for example for imaging or detection purposes. In the example illustrated on FIG. 4A, two pivot axes $203_{ix}$, $203_{iy}$ are formed by arms $213a$, $213b$, $213c$, $213d$. In the example illustrated on FIG. 4B, a mirror $200_i$ is provided with a single pivot axis $203_{ix}$ formed for example by two arms $213a$, $213b$. A different number of sweep axes and support arms, in particular greater, can be provided.

Figure 6A:
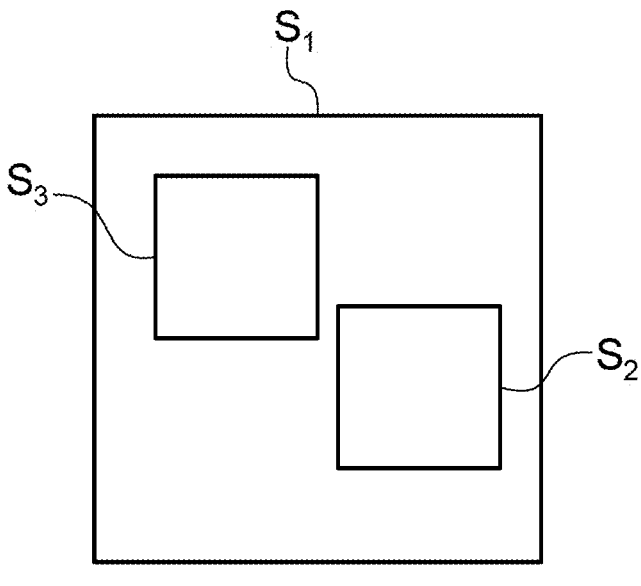
FIGS. 6a, 6b, 6c are illustrations of various surfaces $S_1$, $S_2$, and $S_3$ swept by the beam reflected by, respectively, the mirror in first position, the mirror in second position and the mirror in third position, according to various configurations of the reflector device according to the present invention.
Figure 6B:
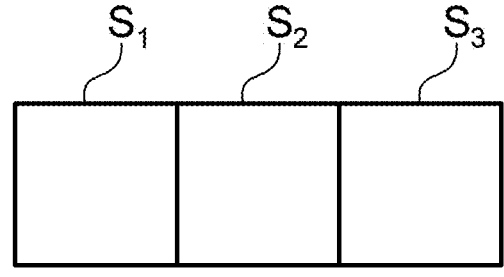
Figure 6C:
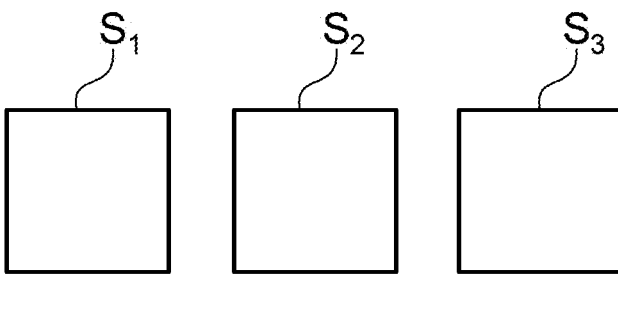

FIGS. 6a, 6b, 6c are illustrations of various surfaces $S_1$, $S_2$ and $S_3$ swept by the beam reflected by, respectively, the mirror in first position $200_1$, the mirror in second position $200_2$, and the mirror in third position $200_3$.

In particular, as illustrated by FIG. 6a, the mirror in first position $200_1$ can in particular make it possible to sweep a surface $S_1$ with an extent greater than those swept by the other mirrors $200_i$ (i ranging from 2 to N, for example N=3). More particularly, the surfaces swept by the mirrors $200_i$ (i ranging from 2 to N, for example N=3) may be separate and included in the surface $S_1$. Such an arrangement makes it possible to image a scene at various resolutions. For example, the surface $S_1$ can be imaged at low resolution, and the surfaces $S_2$ and $S_3$ at a higher resolution.

Alternatively, as illustrated in FIG. 6b, the mirrors $200_1$ to $200_N$ can be designed to image adjacent zones $S_1$, $S_2$ and $S_3$ and for example with respective extents equal or substantially equal.

Still alternatively, and as illustrated in FIG. 6c, the mirrors $200_1$ to $200_N$ can be designed to image separate zones $S_1$, $S_2$ and $S_3$ and for example with respective extents equal or substantially equal.

In order to coordinate the movement of the various mirrors $200_1$ to $200_N$, the reflector device $100$ can be provided with feedback loops BR intended to control the actuators (FIG. 3). The feedback loops BR are advantageously controlled by the control means.

Particularly advantageously, the surface of the mirrors $200_1$ to $200_N$ increases from the first position to the $N^{th}$ position. For example, the mirrors have a circular shape, and have a radius increasing from the first position to the $N^{th}$ position. Such an arrangement thus enables the principal light beam, when it has a sufficiently large diameter, to overflow from the mirror in first position and to reach at least the mirror in second position. In other words, part of the principal light beam reaches the front face $201_i$ of the mirror $200_i$, at the $i^{th}$ position without passing through the mirrors $200_j$ in position j, with j less than i.

Figure 7A:
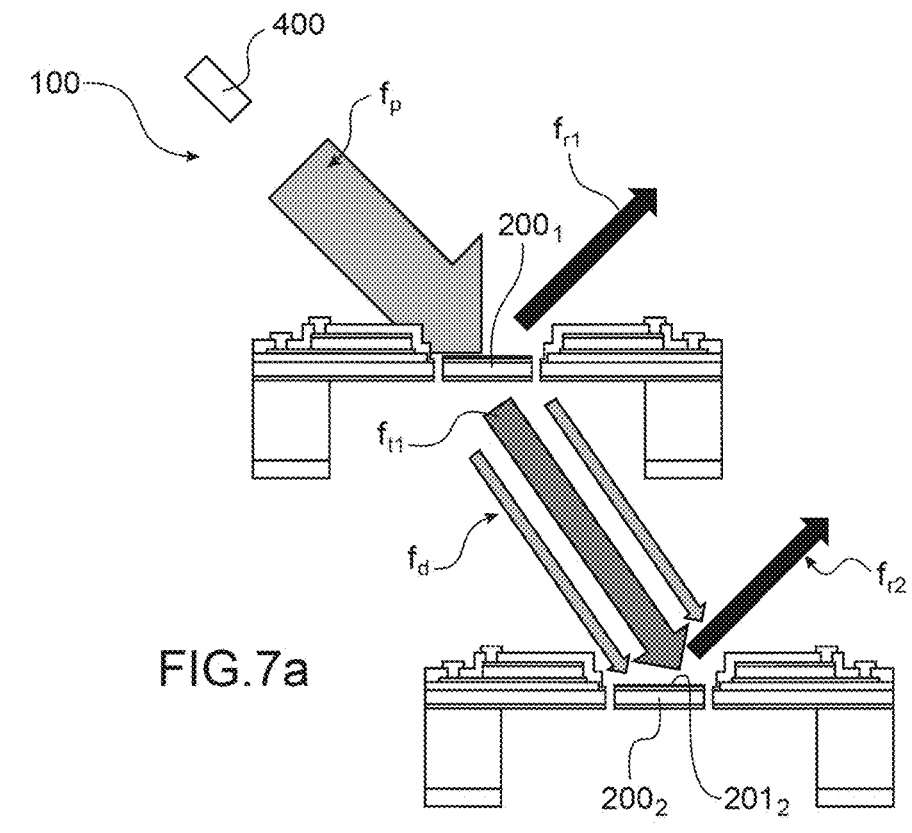
FIGS. 7a, 7b are schematic representations of a reflector device using a principal light beam that has a sufficiently large diameter to overflow from the mirror in first position.

FIG. 7a shows a reflector device $100$ using a principal light beam that has a sufficiently large diameter to overflow from the mirror in first position. The reflector device $100$ is moreover provided with two mirrors $200_1$ and $200_2$. The light source emits a polychromatic principal light beam $f_p$, for example covering a wide principal range of wavelengths. The mirror $200_1$, in first position, is according to this example adapted to fully reflect $(f_{r1})$ a first range of wavelengths of the principal range, and to transmit $(f_{t1})$ the other wavelengths. The mirror $200_2$ (in second position), for its part, can be adapted to reflect $(f_{r2})$ a second range of wavelengths different from the first range (these two ranges nevertheless being able to overlap). Finally, still according to this example, the principal light beam is configured to overflow the mirror $200_1$ in first position, and to form a beam $f_d$ that reaches the front face $201_2$ of the second mirror. This arrangement thus makes it possible to sweep one or more surfaces with two reflected beams covering different ranges of wavelengths.

Figure 7B:
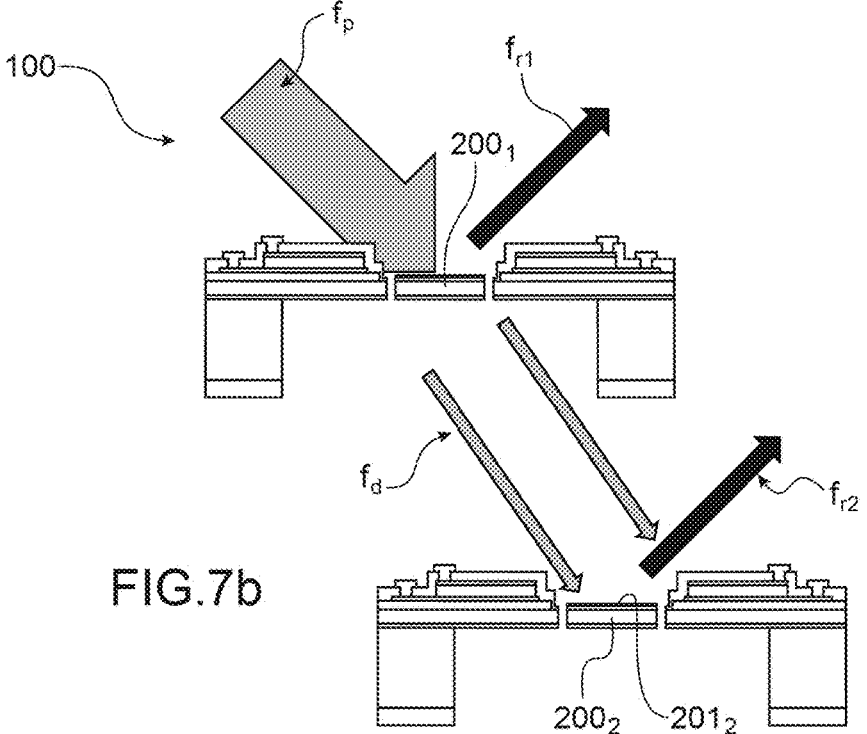

FIG. 7b shows a reflector device $100$ that essentially repeats the elements of the reflector device $100$ of FIG. 7a.

However, according to this example, the mirror $200_1$ in first position is completely opaque in the range of wavelengths covered by the principal light beam so that only the fraction of the principal light beam overflowing the mirror in first position reaches the front face $201_2$ of the mirror $200_2$ in second position. This arrangement, like the one shown in FIG. 7a, makes it possible to sweep one or more surfaces with reflected beams covering different ranges of wavelengths.

These examples are not limited to the use of extended polychromatic sources, but can also involve sources covering several discrete wavelengths.

Figure 8:
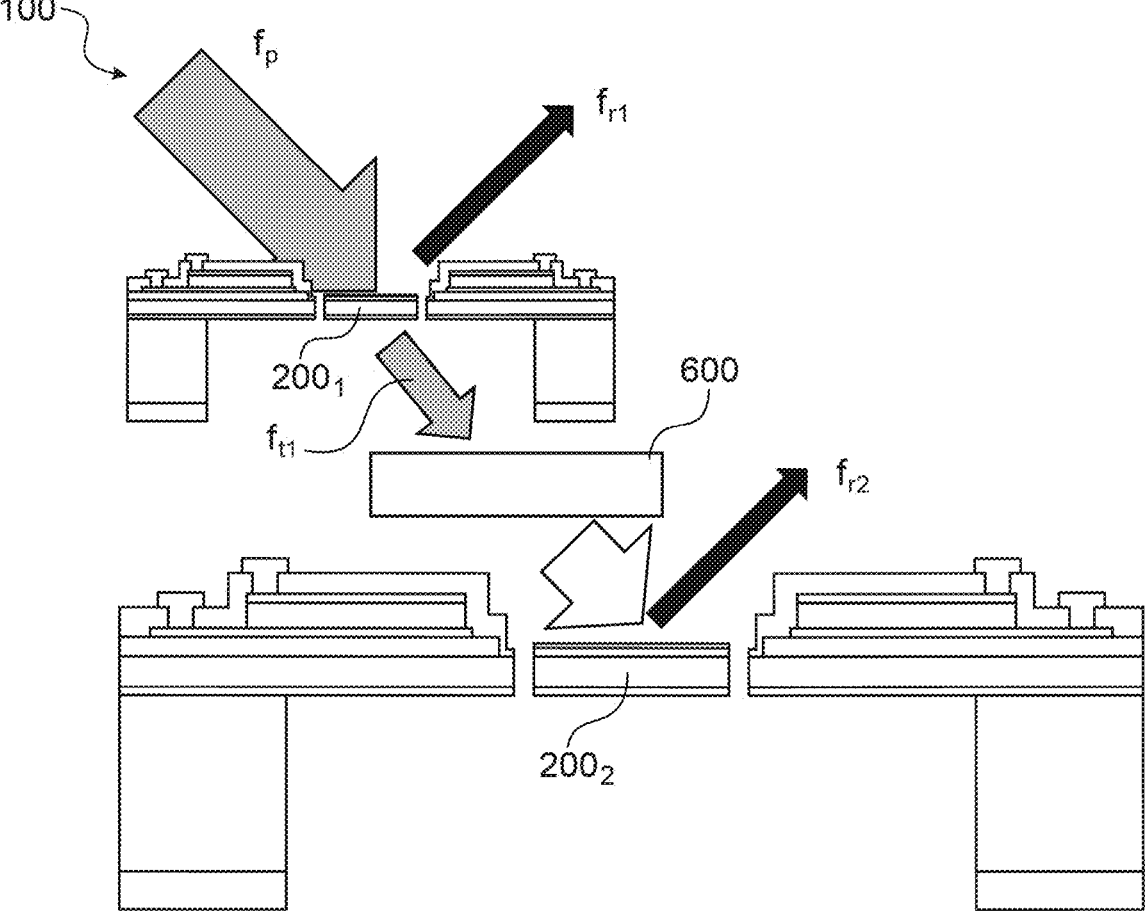
FIG. 8 is a schematic representation of a reflector device provided with an optical element disposed between two mirrors in successive positions.

According to another example illustrated in FIG. 8, the reflector device 100 can comprise an optical element 600, for example a lens, between at least two mirrors in two successive positions in the predefined order. This optical element is in particular arranged on the path of the radiation transmitted by the mirror in an upstream position to the front face of the mirror in a downstream position. By way of example, as shown on FIG. 8, the optical element can comprise one or more lenses intended to magnify the transmitted beam before it reaches the front face of the downstream mirror. Nevertheless, a reducing lens can also be envisaged. Considering this optical element 600 makes it possible to adjust the incident energy density on the downstream mirror. This lens can also serve to adjust the resolution by making it possible to have a beam that covers all the second mirror of larger size (and therefore with greater angular resolution).

Figure 9:
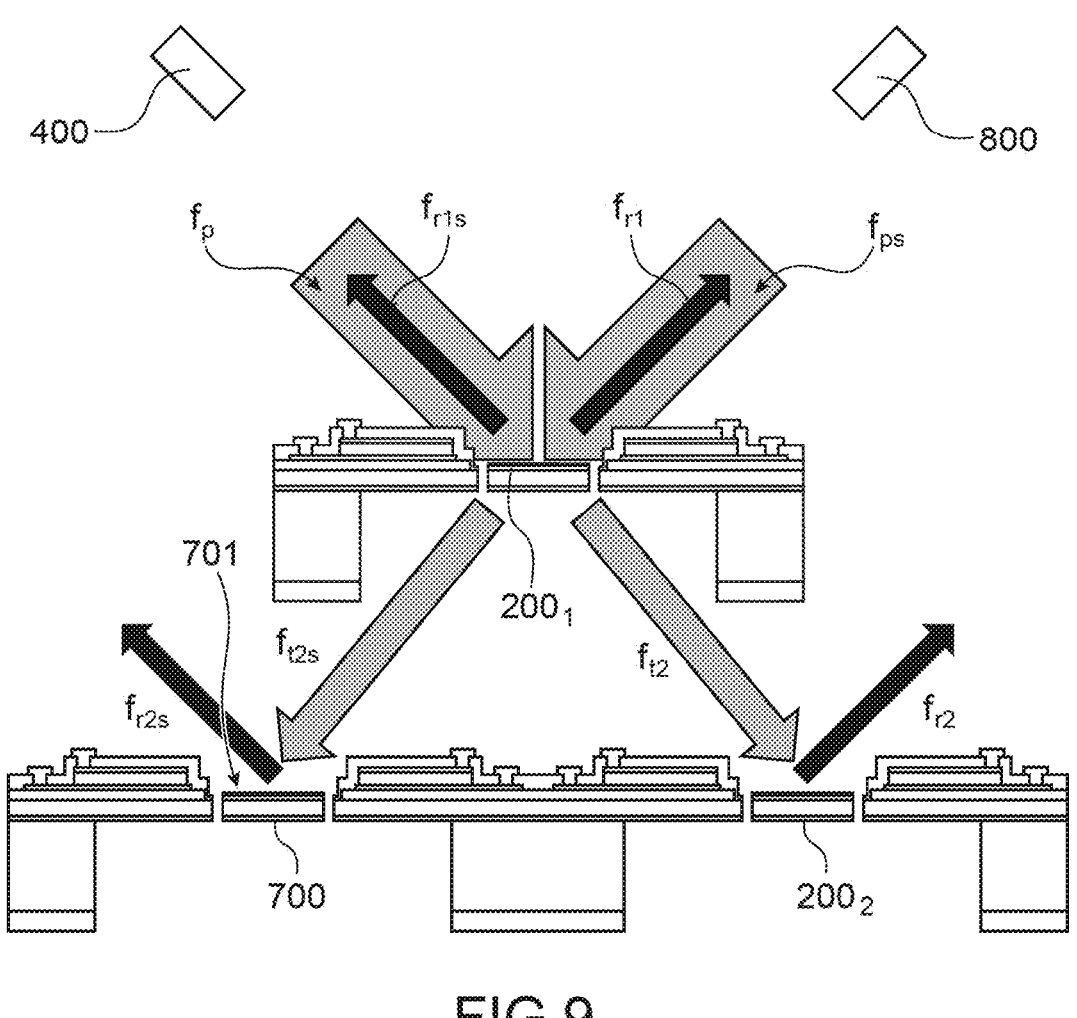
FIG. 9 is a representation of the reflector device provided with at least one secondary mirror.

According to another example illustrated at FIG. 9 (the references being indicated on FIGS. 3 and 5), the reflector device 100 comprises two mirrors $200_1$ and $200_2$, as well as a secondary mirror 700. The secondary mirror 700 is in particular arranged so that a secondary beam $f_{ps}$ incident on the front face $201_1$ of the mirror $200_1$ in first position is firstly partially reflected by said front face $201_1$ and secondly partially transmitted by the rear face $202_1$ of said mirror and then reflected by a secondary front face 701 of the secondary mirror 700. More particularly, the secondary mirror 700 is arranged so that the respective centres of the secondary mirror 700 and of the mirror $200_1$ in first position define an axis, referred to as secondary axis, different from the principal axis, and in alignment with the secondary light beam emitted by the secondary radiation source. Thus, in operation, the light beam $f_{ps}$ is firstly reflected by the front face of the mirror $200_1$ as a reflected beam $f_{t1s}$ and secondly transmitted, by the rear face of said mirror $200_1$, as a transmitted beam $f_{t2s}$. This reflected beam $f_{t2s}$ is in its turn reflected by the secondary mirror 700 as a secondary reflected beam $f_{r2s}$.

With regard to the mirrors or the secondary mirrors, these may have various structures.

Figure 10:
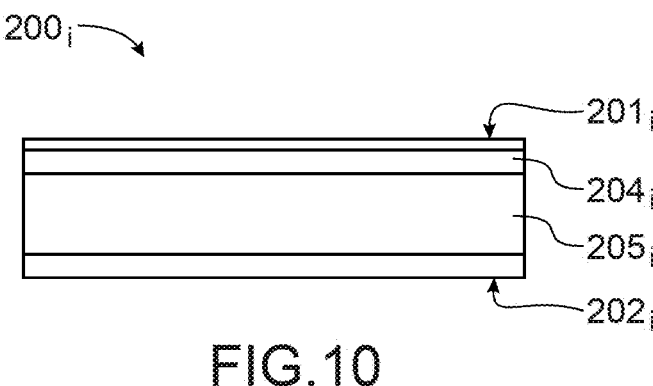
FIG. 10 is a schematic representation of a mirror provided with a reflective layer formed on a mechanical support.

According to a first variant, the mirror $200_i$ may comprise, from its front face $201_i$ to its rear face $202_1$, a partially reflective layer $204_i$ and a mechanical support layer $205_i$ (FIG. 10). Said layers may each have a negligible, or even zero, coefficient of absorption in the range of wavelengths covered by the principal light beam.

Thus, according to this first variant, the partially reflective layer $204_i$ may comprise a Bragg stack (or Bragg mirror) formed by at least one elementary Bragg stack. "Bragg stack" means a periodic succession of transparent, or partially transparent, stacked layers with different refractive indices. One example of an elementary Bragg stack comprises a stack of two layers with different indices and which may be dielectric and/or semiconductive.

In particular, provided that the light beam in question is in the infrared range, and more particularly with a wavelength of 1550 nm, the elementary Bragg stack may comprise a layer of silicon dioxide with a thickness of 268 nm (the refractive index of which at 1550 nm is equal to 1.45) covered with an amorphous silicon layer with a thickness of 113 nm (the refractive index of which at 1550 nm is 3.42). According to this configuration, a Bragg stack comprising a single elementary Bragg stack will have, for an incidence of 20°, a coefficient of reflection equal to 88.8% and a coefficient of transmission equal to 11% faced with a principal light beam with a wavelength of 1550 nm.

The aforementioned stacks, as well as any other stack liable to be used in the context of the present invention, can be formed on a mechanical support layer made for example from a semiconductor or dielectric material. The choice of the material forming the mechanical support layer can, for example, be imposed by the wavelength λ. By way of example, the coefficient of absorption of a mechanical support layer is negligible, or even zero, for wavelengths greater than 1250 nm. In other words, a mechanical support layer made from monocrystalline silicon and with a thickness in particular between 20 μm and 100 μm will undergo heating that will not damage the mirror.

Limiting the number of elementary Bragg stacks reduces the mechanical stresses imposed on the mirror and thus prevents deformation (for example curving) of said mirror.

Moreover, the sizing of the elementary Bragg stack makes it possible to adjust the reflectivity in the range of wavelengths covered by the principal light beam.

Figures 11A, 11B:
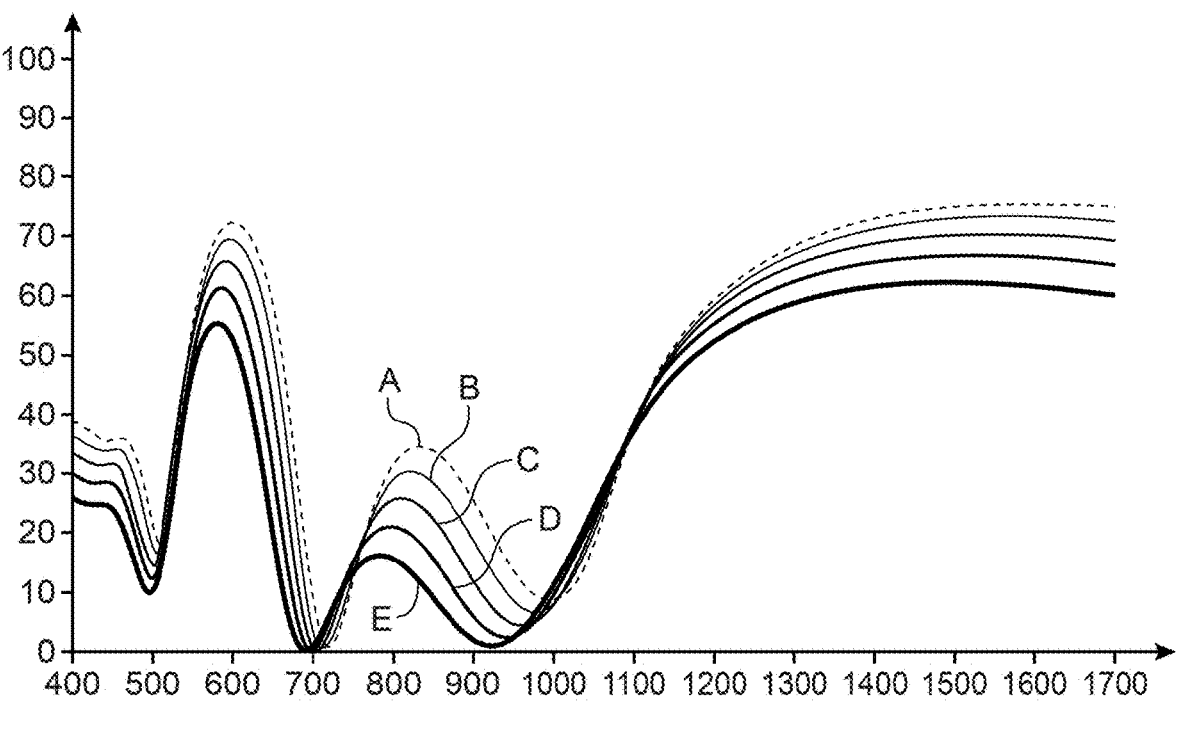
FIGS. 11a, 11b are graphical representations of the reflectivity (on the vertical axis, as %) of an elementary Bragg stack as a function of the wavelength (along the horizontal axis, in nm) for various angles of incidence (curve "A": 35°, "B": 40°, "C": 45°, "D": 50°, "E": 55°) of the principal light beam, respectively at a polarisation p and a polarisation s.

In this regard, FIGS. 11a, 11b are graphical representations of the reflectivity (on the vertical axis, as %) of an example of an elementary Bragg stack as a function of the wavelength (along the horizontal axis, in nm) for various angles of incidence (curves "A": 35°, "B": 40°, "C": 45°, "D": 50°, "E": 55°) of the principal light beam, respectively at a polarisation p and a polarisation s.

Figure 12A:
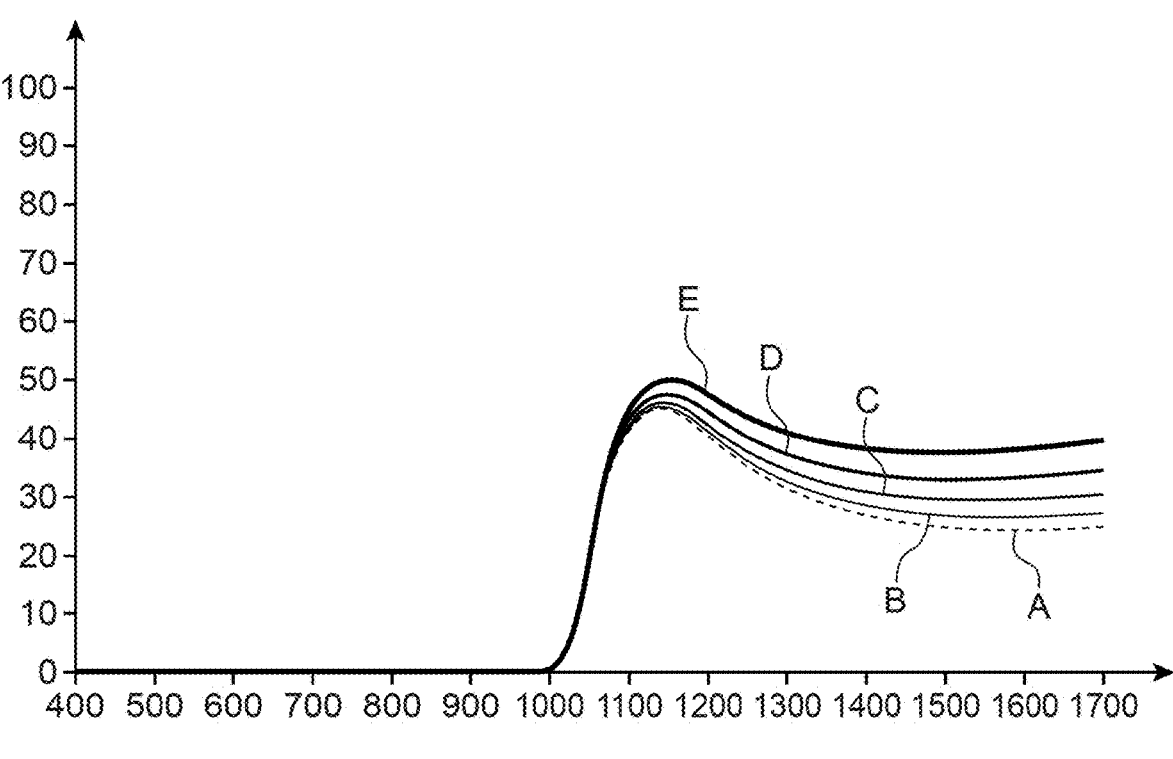
FIGS. 12a, 12b are graphical representations of the transmittance (on the vertical axis, as %) of an elementary Bragg stack as a function of the wavelength (along the horizontal axis, in nm) for various angles of incidence (curve "A": 35°, "B": 40°, "C": 45°, "D": 50°, "E": 55°) of the principal light beam, respectively at a polarisation p and a polarisation s.
Figure 12B:
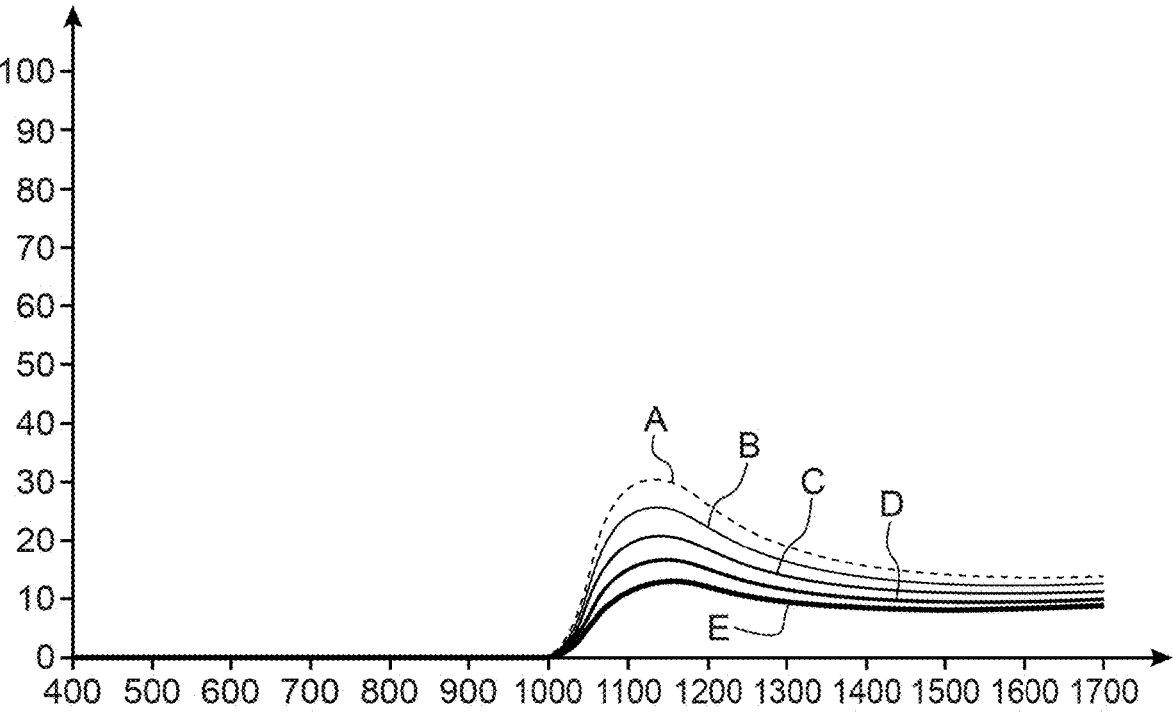

In an equivalent manner, FIGS. 12a, 12b are graphical representations of the transmittance (on the vertical axis, as %) of an elementary Bragg stack as a function of the wavelength (along the horizontal axis, in nm) for various angles of incidence (curves "A": 35°, "B": 40°, "C": 45°, "D": 50°, "E": 55°) of the principal light beam, respectively at a polarisation p and a polarisation s.

These graphs (FIGS. 11a, 11b, 12a and 12b) reveal a reflectivity and the transmittance that vary little in the infrared range as a function of the angle of incidence. Moreover, still in this wavelength range, the absorption of the elementary Bragg stack is negligible.

According to a second variant, the mirrors $200_1$ to $200_N$ can comprise a reflective layer made from metal. These mirrors, in order to ensure partial transmission of the light beam, can then comprise through openings formed in the reflective layer. Alternatively, the reflective layer can comprise metal zones and dielectric zones.

Figure 13A:
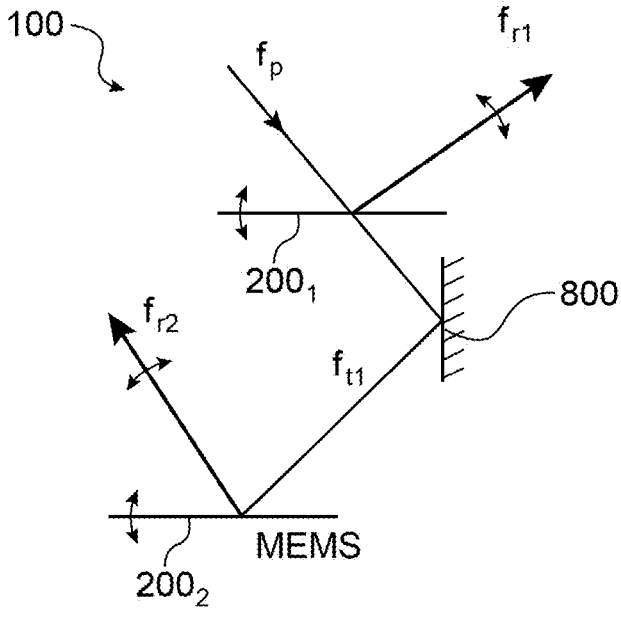
FIGS. 13a, 13b are a schematic representations in a cross-sectional plane perpendicular to each of the mirrors of a reflector device according to a second embodiment of the present invention.
Figure 13B:
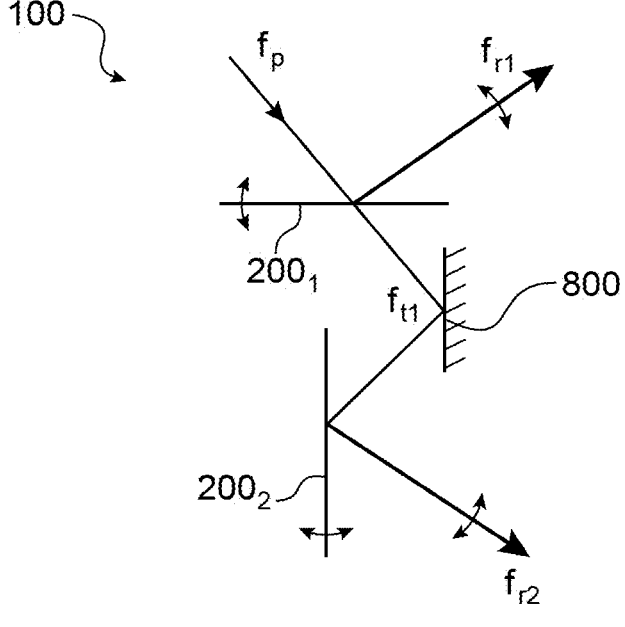

The present invention also relates to a second embodiment that essentially repeats the elements relating to the first embodiment (FIGS. 13A and 13B).

However, according to this embodiment, the centres of the mirrors $200_1$ to $200_N$ (with N in this example equal to 2), are not aligned so that the reflector device 100 is provided with optical elements 800 intended to convey the light beam transmitted by the rear face of a mirror in a given position to the front face of the mirror in the following position in the principal order. In this regard, at least one optical element comprises at least one of the components selected from: a prism, a lens or, as in the example illustrated, a deflector mirror.

9

REFERENCES

[1] Sven Holmstrom et al., "MEMS laser scanners: a review", Journal of Microelectromechanical Systems—April 2014, DOI: 10.1109/JMEMS.2013.2295470.

The invention claimed is:

1. A reflector device configured to form N reflected beams from a principal light beam, the device comprising:
a support;
a light source arranged to emit a principal light beam on a principal axis;
N partially transparent mirrors, N being an integer greater than or equal to 2, delimited by a partially reflective front face, and a rear face opposite to the front face, wherein each mirror is mounted on an intermediate support so as to pivot about one or more pivot axes relative to the intermediate support, and each mirror is associated with one or more actuators arranged to pivot said mirror on one or other or both of the pivot axes, the actuator being selected from: an electrostatic actuator, a magnetic actuator, a piezoelectric actuator, and a thermal actuator,
wherein the intermediate supports of the N partially transparent mirrors are suspended on and mechanically connected to a common support by suspension structures of different heights, said suspension structures being distributed at different locations on the support so that the mirrors are offset from one another and suspended at different heights relative to the common support,
wherein the mirrors are arranged, in an order, from a first position to an $N^{th}$ position, so that the principal light beam is incident on the front face of the mirror in the first position, and interacts successively, in the order, with each mirror to form a beam reflected by the front face and a beam transmitted by the rear face, the beam reflected by the front face of the mirror in a position i, i being between 2 and N, resulting from the reflection of the beam transmitted by the rear face of the mirror in the position i−1.

2. The reflector device according to claim 1, wherein the N mirrors each have a circular shape, and a radius increasing from the first position to the $N^{th}$ position in the order.

3. The reflector device according to claim 1, wherein N is equal to 2, and the reflector device also comprises a secondary mirror arranged so that a secondary beam incident on the front face of the mirror in first position is firstly partially reflected by said front face and secondly partially transmitted by the rear face of said mirror and then reflected by a secondary front face of the secondary mirror, and said reflector device comprises a secondary light source able to emit the secondary light beam.

4. The reflector device according to claim 3, wherein the secondary mirror is arranged so that the respective centres of the secondary mirror and of the mirror in first position define an axis, referred to as secondary axis, different from the principal axis, and wherein the secondary light source is arranged so that the secondary light beam is emitted on the secondary axis.

5. The reflector device according to claim 1, wherein optical elements are used to convey the light beam transmitted by the rear face of a mirror in a given position to the front face of the mirror in the following position in the principal order.

6. The reflector device according to claim 5, wherein at least one of said optical elements comprises at least one of the components selected from: a prism, a deflector mirror, a lens.

7. The reflector device according to claim 1, wherein each mirror comprises, from its front face to its rear face, a partially reflective layer and a mechanical support layer.

8. The reflector device according to claim 7, wherein the partially reflective layer comprises a Bragg stack, the Bragg stack comprising at least one elementary Bragg stack.

9. The reflector device according to claim 8, wherein an elementary Bragg stack comprises a stack of two dielectric and/or semiconductor layers, advantageously an elementary Bragg stack comprises a layer of amorphous silicon and a layer of silicon oxide.

10. The reflector device according to claim 8, wherein the Bragg stack is limited to one or two elementary Bragg stacks.

11. The reflector device according to claim 7, wherein the mechanical support layer comprises a semiconductor material, advantageously silicon, even more advantageously monocrystalline silicon.

12. The reflector device according to claim 1, wherein the N mirrors are arranged so that each of the N light beams sweeps a different surface.

13. The reflector device according to claim 1, wherein at least one mirror is arranged so that the surface swept by the light beam reflected by the front face of a mirror in question among said N mirrors has a reduced extent compared with the surfaces swept by the other reflected light beams.

14. The reflector device according to claim 1, wherein at least one mirror among the N mirrors forms an optical filter.

15. The reflector device according to claim 1, wherein the light beam has a wavelength of between 1400 nm and 1700 nm, advantageously 1550 nm.

16. The reflector device according to claim 1, wherein, among said N mirrors, the one arranged in first position is configured to transmit, to a mirror arranged in second position, the principal light beam incident at at least 50% and at no more than 99%.

* * * * *